United States Patent [19]

Matthew

[11] Patent Number: 5,781,545
[45] Date of Patent: Jul. 14, 1998

[54] PACKET SOURCE EXCLUSION METHOD

[75] Inventor: Richard Dean Matthew, San Carlos, Calif.

[73] Assignee: Harris Corporation, Melbourne, Fla.

[21] Appl. No.: 651,567

[22] Filed: May 22, 1996

[51] Int. Cl.$^6$ .................................................. H04J 3/00
[52] U.S. Cl. .......................................... 370/389; 370/403
[58] Field of Search ................................. 370/392, 402, 370/403, 404, 405, 406, 389, 390, 393, 395–399, 407, 424, 428, 451; 340/825.05

[56] References Cited

U.S. PATENT DOCUMENTS 5,088,091  2/1992  Schroeder et al. .................... 370/406
5,390,173  2/1995  Spinney et al. ....................... 370/393

*Primary Examiner*—Dang Ton
*Attorney, Agent, or Firm*—Rogers & Killeen

[57] ABSTRACT

A method of communicating among nodes connected in a loop in which information packets are initially transmitted in both directions around the loop to assure reception at a destination node. Each of the transmitted packets is provided with its respective source node address, and upon receiving one of the transmitted packets at one of the nodes, a block-out period is started. During the block-out period other transmitted packets which have the same source node address as the received packet and which arrive at other ports of the receiving node are discarded to reduce packet congestion in the loop, thereby increasing the efficiency of use of loop bandwidth.

15 Claims, 2 Drawing Sheets

PACKET SOURCE EXCLUSION METHOD

BACKGROUND OF THE INVENTION

The present invention relates to loop communication systems, and more particularly to a method of improving the efficiency of the loop by reducing message congestion.

Some communication systems have communicating nodes which are connected in a loop and in which packets of information are sent around the loop from node to node until a destination is reached. In order to insure that a packet of information which has been transmitted from one node reaches its destination each packet is sent through the loop in both directions. A technique by which this may be accomplished is to retransmit each packet received at each node in every direction but the one from which a packet was received, and not to retransmit a packet if a receiving node recognizes itself as the originator of the packet. This is known as flood broadcasting. However, conventional flood broadcasting in a loop system is not an efficient use of communication bandwidth available in the loop.

An example of flood broadcasting in a loop is illustrated in FIG. 1 in which nodes with addresses I–V each have ports for receiving and transmitting the information packets. Assume that node I generates a command for node III which is communicated into the loop at node II where it is retransmitted in both directions as packets COM A and COM B around the loop (that is, in all directions except the one from which received.) Packet COM A arrives at its destination, node III, which provides a response, RESP 1, which it then transmits in both directions as RESP 1A and RESP 1B. Both RESP 1A and RESP 1B circle the loop until they are stopped by node III, their originator. They are also transmitted back to node I. In the meantime, COM B has also arrived at node III which is its destination and which provides a response RESP 2, which it then transmits in both directions as RESP 2A and RESP 2B. Both RESP 2A and RESP 2B circle the loop until they are stopped by node III, their originator. They are also transmitted back to node I.

As is apparent, node III receives both command packets A and B, when only one command packet is needed, and provides response packets for both (four packets in all), thereby clogging the loop with extra packets which use valuable bandwidth. A more efficient method for propagating messages through a loop system is desired.

Accordingly, it is an object of the present invention to provide a novel method of communicating in a loop communication system which obviates the problems of the prior art.

It is another object of the present invention to provide a novel method of communicating information packets among plural nodes connected in a loop in which a block-out period is used to restrict the retransmission of packets in the loop.

It is yet another object of the present invention to provide a novel method of reducing the number of information packets transmitted by flood broadcasting among plural nodes connected in a loop in which each node, upon receipt of a transmitted packet from one direction, starts a block-out period and discards further packets from the same originator as the received packet arriving from other directions within the block-out period.

It is still another object of the present invention to provide a novel method of communicating information packets among plural nodes in which each of the transmitted packets includes its source node address, and in which each of the nodes, when receiving each one of the transmitted packets, starts timing a period that is a maximum loop propagation delay ($t_{MAX}$), and until the expiration of $t_{MAX}$ discards transmitted packets having a source node address which is the same as that of the received packet and which are received from another direction, to thereby reduce the number of packets in the loop compared to the prior art.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

The method of present invention reduces the number of packets circulating in a loop communication system by using a block-out period to restrict the retransmission of information packets. Each of the transmitted packets is provided with its respective source node address (the address of the node originating the packet) so that a receiving node will be able to identify the originator of each received packet. Each of the nodes, upon receiving one of the transmitted packets at one of its ports, starts a block-out period and discards other transmitted packets with the same source node address as the received packet which arrive at other ports of the receiving node within the block-out period.

The method improves the efficiency of propagation of messages in the loop by enforcing two rules: (1) if a packet is received from one source node address at one port, any further packets from that source node address arriving at other ports will be discarded (killed or otherwise removed so as not to circulate in the loop), and (2) if a packet from one source node address has not been received within a particular block-out period, preferably the maximum loop propagation delay time, $t_{MAX}$ (the maximum time for a packet to circulate the loop), then a packet with that source node address will be received at any port.

To enforce these rules, each packet includes its source node address so as to be recognizable by a receiving node, and each node is provided with a timer (which may be conventional) for timing the block-out period. The delay time $t_{MAX}$ may be determined conventionally and may be updated as appropriate.

In a further preferred embodiment each packet may also include a destination node address. In yet a further preferred embodiment each node may discard a packet if the node recognizes itself as the originator of the packet (the packet source node address is the same as the receiving node address). These features enhance operation, but are not required in the present invention.

Figure 1:
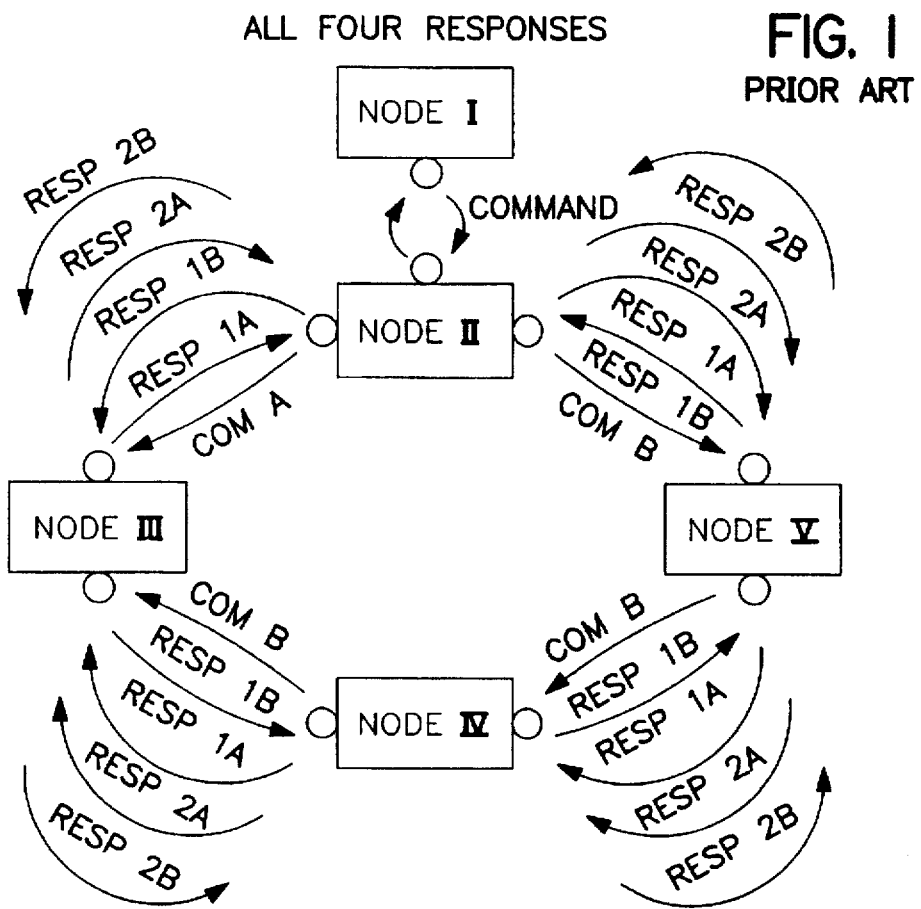
FIG. 1 is a diagram of a loop communication system of the prior art illustrating issuance of a command by flood broadcasting and the responses elicited.
Figure 2:
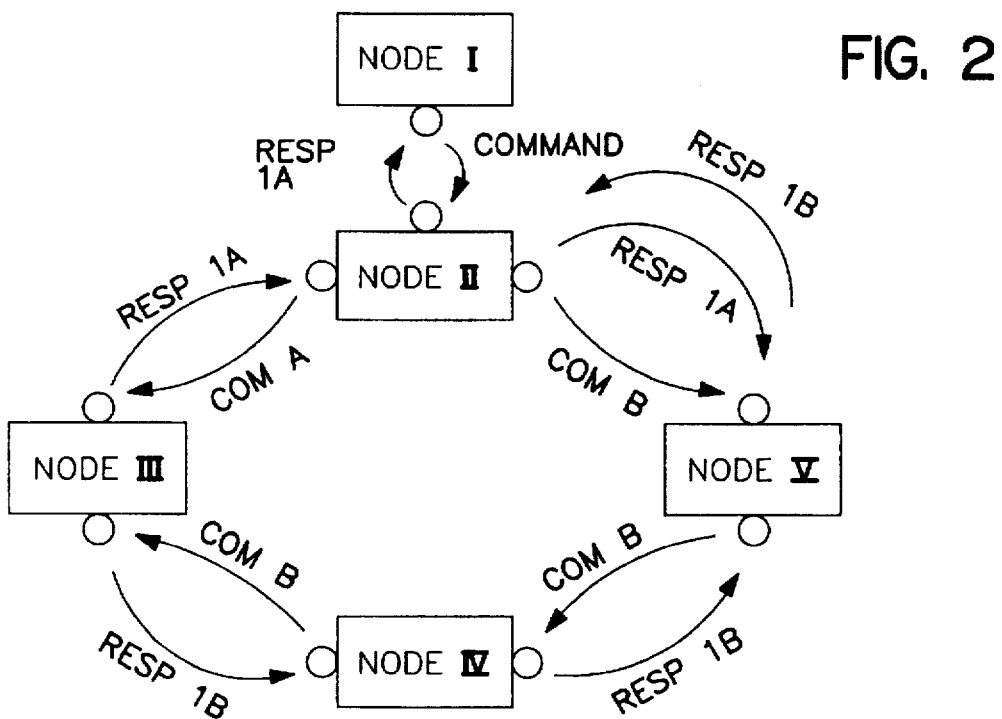
FIG. 2 is a diagram of an exemplary loop communication system in which an embodiment of the method of the present invention is used and illustrating issuance of a command and the responses elicited.

An example of operation of the present invention may be seen in FIG. 2 which includes the same loop arrangement and the same single command from node I to node III as in FIG. 1. Assume that node I generates a command for node III which is communicated into the loop at node II where it is retransmitted in both directions as packets COM A and COM B around the loop (that is, in all directions except the one from which received.) Packet COM A arrives at its destination, node III, which provides a response, RESP 1, which it then transmits in both directions as RESP 1A and RESP 1B. Both RESP 1A and RESP 1B attempt to circle the loop. However, in contrast to the prior art, RESP 1A is stopped by node V and discarded because node V has already received RESP 1B from node IV (assuming RESP 1B arrived first), and RESP 1B is stopped and discarded by node II because RESP 1A arrived first. Thus, only RESP 1A is transmitted back to node I. In the meantime, COM B has also arrived at node III which is its destination, but there is no response because COM A has already arrived, causing COM B to be discarded by node III. That is, in contrast to the prior art, there is no RESP 2 to clog the loop, and node I receives but one response, RESP 1A.

Figure 3:
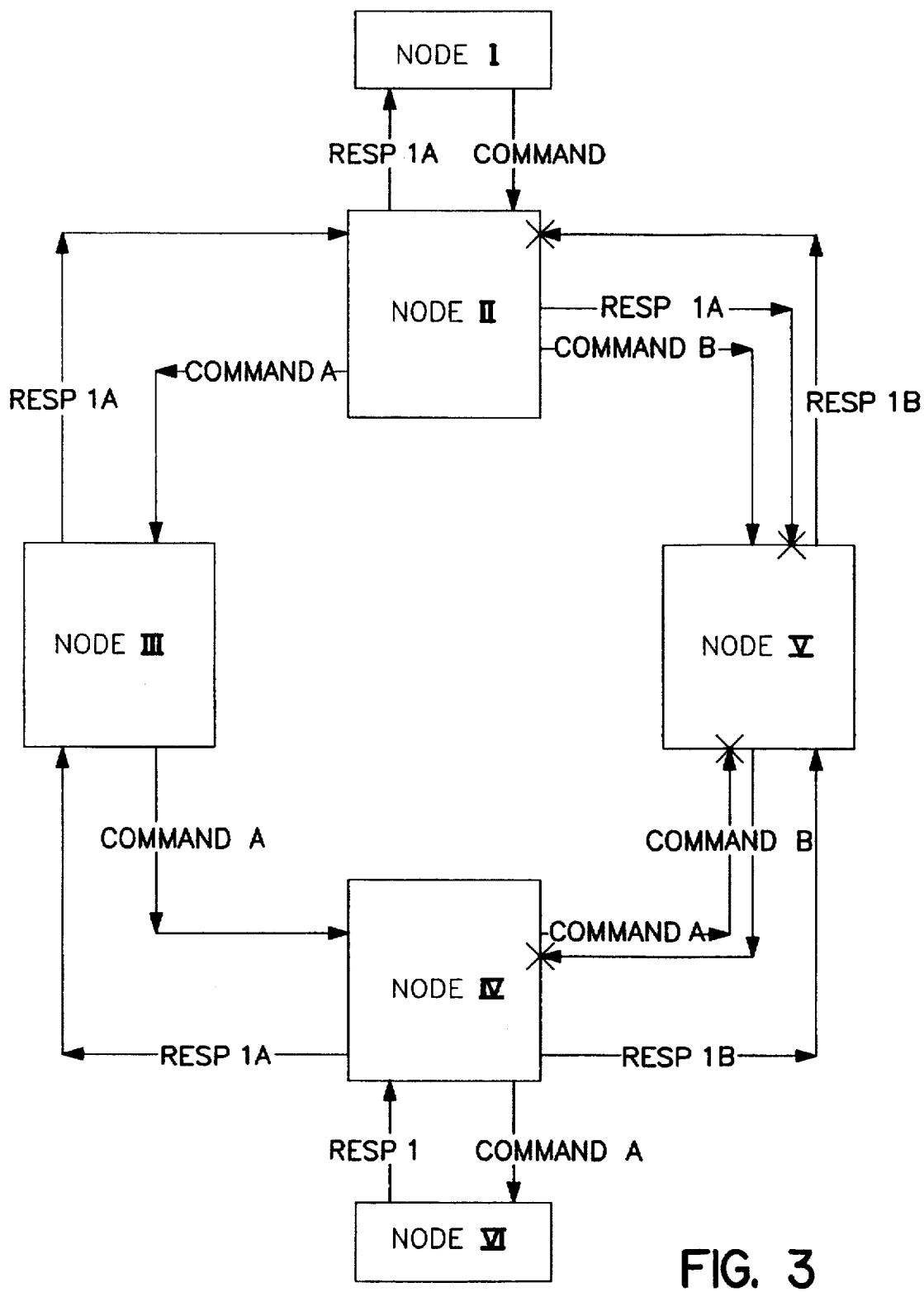
FIG. 3 is a diagram of a further exemplary loop communication system in which an embodiment of the method of the present invention is used and illustrating issuance of a command and the responses elicited.

Another example of operation of the present invention may be seen in FIG. 3 which includes additional node VI to which the command from node I is addressed. The command from node I enters the loop at node II which sends packets COM A and COM B from all of node II's ports except the port at which the command was received. COM A and COM B arrive at node IV, and assuming the COM A was first, COM B is discarded. COM A is provided to node VI which provides RESP 1 which enters the loop at node IV and propagated as RESP 1A and RESP 1B. Assuming that RESP 1A reaches node II first, RESP 1B is discarded by node II, and only RESP 1A reaches node I. RESP 1A reaches node V where it is discarded because RESP 1B arrived first.

The information packets in the figures include commands which elicit responses which are used by way of example only; packets of any type may be used, with or without a response. Upon receipt of a message a node may take various actions, including without limitation, echoing a received message back to the node that sent the message, forwarding a received message to other nodes, generating a response that is sent back to the originator or to other nodes, waiting for receipt of combinations of messages from combinations of nodes and then taking an action, or any combination of these actions.

The content and configuration of the packets of information is not part of the present invention (except the inclusion of the source node address) and the packets may be conventional. Similarly, the nodes may be conventional, except for the ability to time the block-out period and ability to discard packets, both of which are within the level of skill in this art. The nodes may be connected conventionally, such as with fiber optic or wire cable, radio, and in other ways known in the art by which messages may be communicated.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A method of communicating information packets among plural nodes connected in a loop, each of the nodes having plural ports for receiving and transmitting the packets in the loop, the method comprising the steps of:

(a) initially transmitting each of plural information packets in both directions around the loop;

(b) providing each of the transmitted packets with its respective source node address; and (c) at each of the nodes, when receiving each one of the transmitted packets, (i) start timing a period that is a maximum loop propagation delay, $t_{MAX}$, (ii) retransmitting the received packet from all ports of the receiving node, except the receiving port, and (iii) until expiration of $t_{MAX}$, not permitting reception on ports other than the receiving port of ones of the transmitted packets having a source node address which is the same as the source node address of the received packet, and permitting reception thereof after expiration of $t_{MAX}$.

2. The method of claim 1 further comprising the step of selectively providing the plural information packets with destination node addresses.

3. The method of claim 1 wherein at each node, upon receipt of each of the packets, further comprising the step of discarding the received packet if its source node address is the same as the address of the receiving node.

4. The method of claim 1 wherein the step of not permitting reception comprises the step of discarding the packets.

5. A method of reducing the number of information packets transmitted among plural nodes connected in a loop, each of the nodes having plural ports for receiving and transmitting the packets in the loop, and in which each of the packets is initially transmitting in both directions around the loop, the method comprising the steps of:

(a) providing each of the transmitted packets with its respective source node address; and (b) upon receiving one of the transmitted packets at one of the ports of one of the nodes, starting a block-out period and discarding other transmitted packets with the same source node address as the received packet arriving at other ports of the receiving node within the block-out period.

6. The method of claim 5 further comprising the step of repeating step (b) upon expiration of the block-out period.

7. The method of claim 6 further comprising the step of retransmitting the received packet from all ports of the receiving node, except the receiving port.

8. The method of claim 7 wherein the step of starting the block-out period comprises the step of timing a period that is a maximum propagation delay around the loop, $t_{MAX}$, which becomes the block-out period.

9. The method of claim 8 wherein at each node, upon receipt of each of the packets, further comprising the step of discarding the received packet if its source node address is the same as the address of the receiving node.

10. A method of reducing the number of information packets transmitted by flood broadcasting among plural nodes connected in a loop, the method comprising the steps of:

(a) identifying each of the transmitted packets with its respective source node address; and (b) upon receiving one of the transmitted packets at one of the nodes, starting a block-out period and discarding other transmitted packets with the same source node address as the received packet arriving at the receiving node from other directions within the block-out period.

11. The method of claim 10 further comprising the step of selectively providing the transmitted packets with respective destination node addresses.

12. The method of claim 10 wherein the block-out period is at least a maximum propagation delay around the loop, $t_{MAX}$.

13. The method of claim 10 further comprising the step of repeating step (b) upon expiration of the block-out period.

14. The method of claim 10 wherein at each node, upon receipt of each of the packets, further comprising the step of discarding the received packet if its source node address is the same as the address of the receiving node.

15. A method of communicating information packets among plural nodes connected in a loop, each of the nodes having plural ports for receiving and transmitting the packets in the loop, the method comprising the steps of:

(a) initially transmitting each of plural information packets in both directions around the loop;

(b) providing each of the transmitted packets with its respective source node address and destination node address;

(c) at each of the nodes, when receiving each one of the transmitted packets, (i) discarding the received packet if its source node address is the same as the address of the receiving node, and if the received packet is not discarded, (ii) start timing a period that is a maximum loop propagation delay, $t_{MAX}$, (iii) retransmitting the received packet from all ports of the receiving node, except the receiving port, (iv) until expiration of $t_{MAX}$, on ports other than the receiving port, discarding ones of the transmitted packets having a source node address which is the same as the source node address of the received packet, and (v) after expiration of $t_{MAX}$, permitting reception of any of the transmitted packets.

* * * * *